Figure 1A:
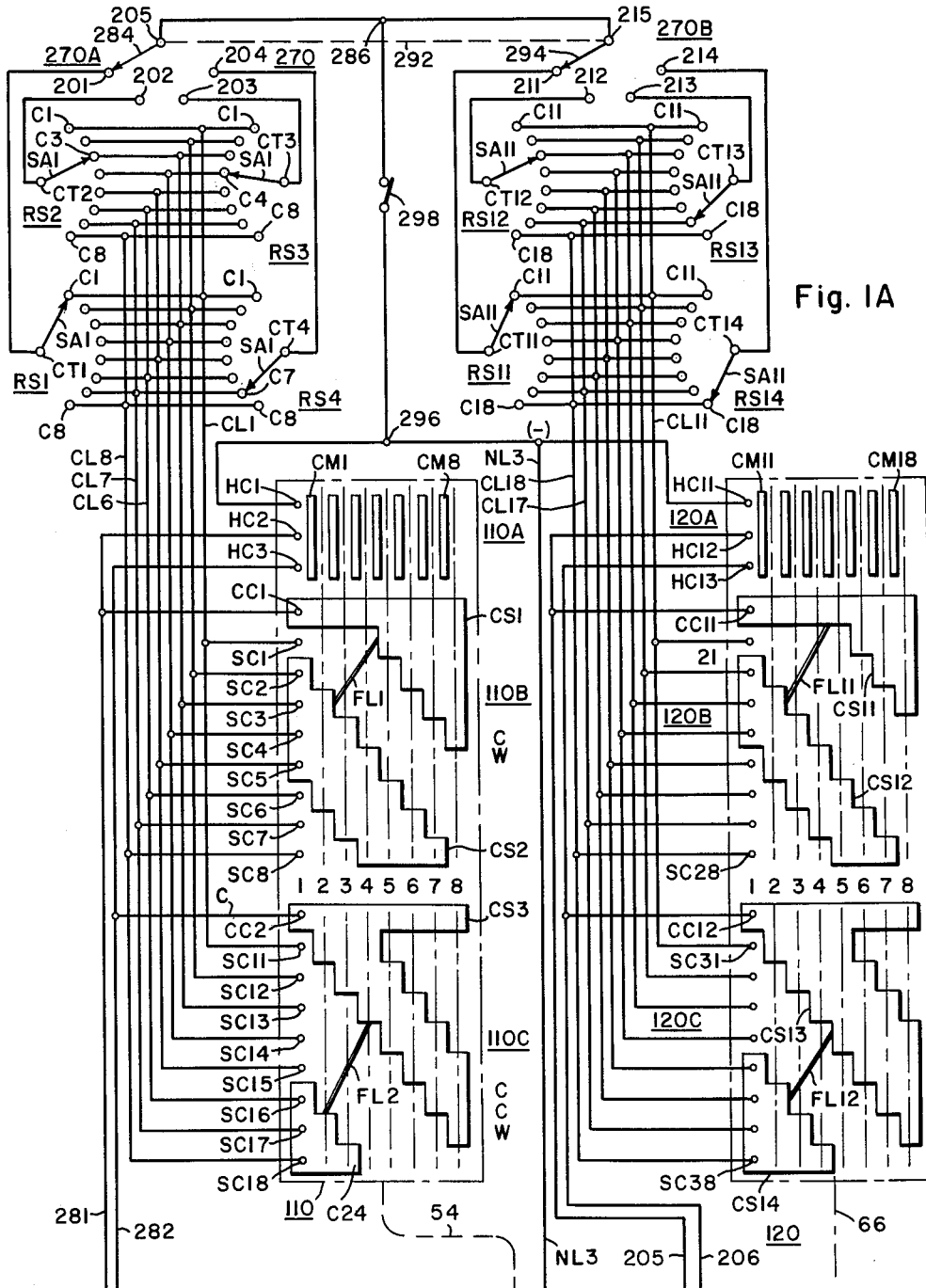

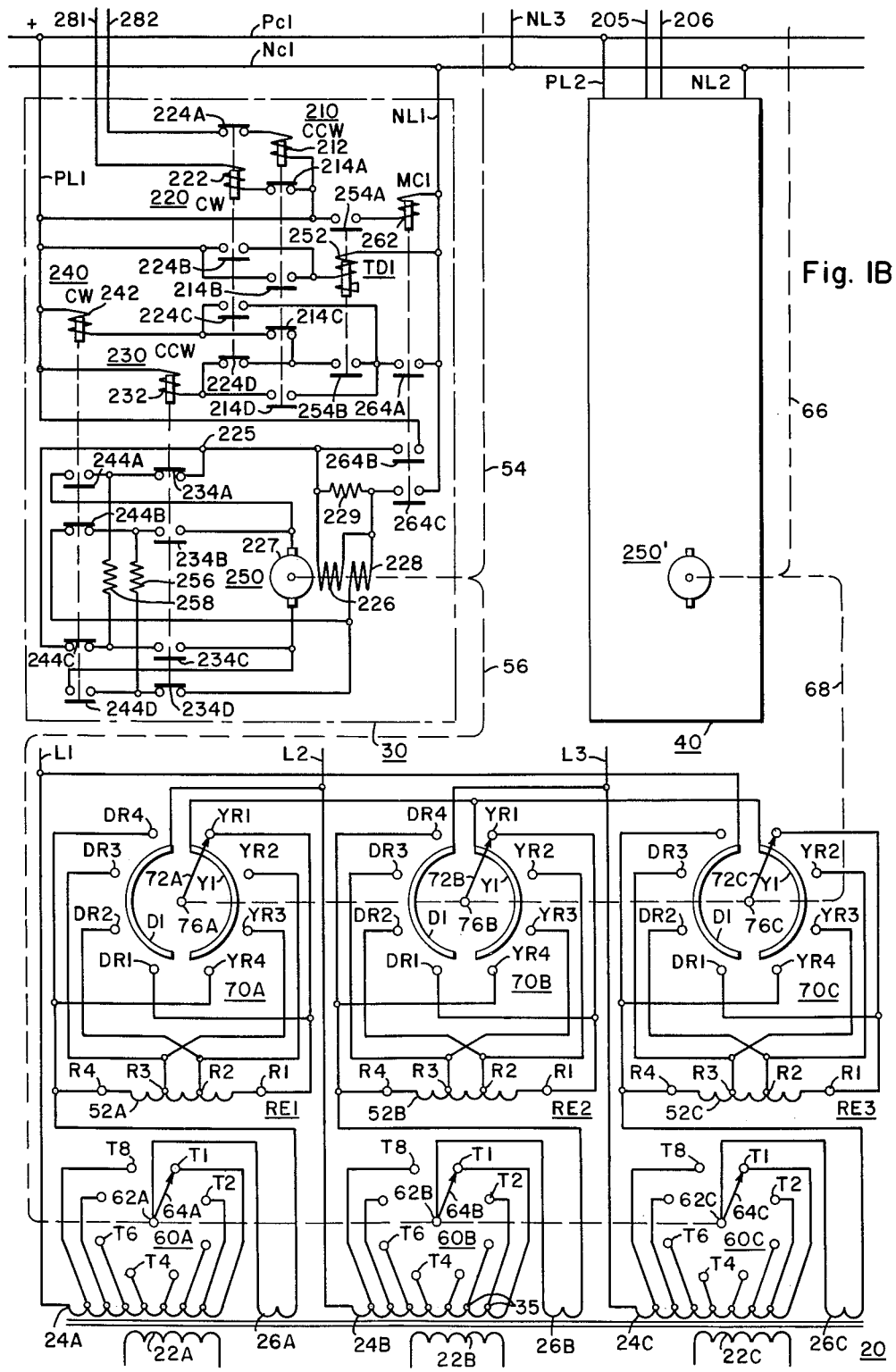
Fig. IB

United States Patent Office 3,086,164
Patented Apr. 16, 1963

3,086,164
TAP-CHANGING EQUIPMENT
William M. Bogert and Henry V. Johnson, Hickory Township, Mercer County, Pa., assignors to Westinghouse Electric Corporation, East Pittsburgh, Pa., a corporation of Pennsylvania
Filed Feb. 17, 1960, Ser. No. 9,300
14 Claims. (Cl. 323—43.5)

This invention relates to transformers and, more particularly to tap-changing equipment used with transformers.

Many transformers are operated under conditions which require that the voltage ratio between the primary and secondary windings be adjusted at intervals or steps. This may be accomplished by providing one of the transformer windings with a plurality of tap connections so that by operation of tap-changing equipment associated with the transformer, a selected number of turns of one of the windings may be excluded from or included in the winding circuit, as desired, thus varying the effective number of turns in the winding. In certain types of liquid filled power transformers, such as furnace transformers, one of the windings is provided with a very large number of tap connections. In a conventional transformer of this type, only a limited number of tap connections are made available to the tap-changing equipment for a particular application of the transformer. In our U.S. Patent 2,915,694, which issued December 1, 1959, and which is assigned to the same assignee as the present application, there is disclosed an improved tap-changing equipment for transformers of the above type in which all the taps in the windings of the transformer are made available to the tap changing equipment, but undesired tap positions may be conveniently eliminated from the operation of the tap-changing equipment by changes in the connections of the control circuit associated with the tap-changing equipment rather than having a man enter the tank of the associated transformer, as was required in certain types of prior art transformer equipment.

On smaller ratings of transformers of the above type, it is desirable to supplement the reactance of the transformer by providing a separate reactor whose reactance effectively adds to that of the associated transformer. The effective reactance of the reactor which is connected in circuit relation with the associated transformer may be varied under different operating conditions by providing the windings of the reactor with a plurality of tap connections and suitable tap-changing equipment which selects one of the tap connections on the reactor. It is therefore desirable that tap-changing equipment of the type disclosed in U.S. Patent 2,915,694, previously mentioned, be provided which is adapted for use with a transformer and its associated reactor in order to obtain the same operating advantages of the tap-changing equipment disclosed in said patent, as well as several additional advantages, such as reduced operating time and travel of the tap-changing equipment when changing tap connections.

It is an object of this invention to provide new and improved tap-changing equipment for use with transformers.

Another object of this invention is to provide a new and improved means for limiting the number of taps which a tap-changing equipment may select from all of the taps connected to the tap-changing equipment provided with a transformer and its associated reactor.

A further object of this invention is to provide for minimizing the operating time and travel of tap-changing equipment associated with a transformer.

Other objects of the invention will, in part, be obvious and will, in part, appear hereinafter.

For a fuller understanding of the nature and objects of the invention, reference should be had to the following detailed description taken in connection with the accompanying drawings, in which:

FIGS. 1A and 1B are a composite diagrammatical view showing the connections between the tap-changing equipment and the windings of the transformer and its associated reactor.

Referring now to the drawings and FIG. 1B in particular, there is shown a transformer 20 having primary winding sections 24A and 26A, 24B and 26B, and 24C and 26C and the secondary windings 22A, 22B and 22C, respectively, which are inductively disposed therewith on a common magnetic core structure. In this instance, the transformer 20 is disposed to receive power from the line conductors L1, L2 and L3 which are part of a three-phase electrical power system. In order to add to the different effective reactances associated with the transformer 20, the reactors RE1, RE2 and RE3 may be connected in circuit relation with the primary winding sections 24A and 26A, 24B and 26B, and 24C and 26C, respectively, of the transformer 20 during certain operating conditions. The reactors RE1, RE2, and RE3 include the reactor windings 52A, 52B and 52C, respectively, which are effectively connected in series circuit relation with the associated primary winding sections of the transformer 20 during certain operating conditions.

The primary winding sections 24A, 24B and 24C of the transformer 20 are each provided with a plurality of tap connections 33, 35 and 37, respectively. The primary winding sections 26A, 26B and 26C each include a fixed number of turns which are connected in series circuit relationship with a portion of the turns of the primary winding sections 24A, 24B and 24C, respectively. The primary winding sections 24A and 26A are connected in circuit relation with the associated reactor RE1 to one of the phases of the three-phase electrical system at the line conductors L1, L2 and L3, while the primary winding sections 24B and 26B and 24C and 26C are connected in circuit relation with the associated reactors RE2 and RE3, respectively, to the other two phases of said three-phase electrical system. The primary winding sections 24A, 24B and 24C are permanently connected at one end thereof to the line conductors L1, L2 and L3, respectively. Similarly, the windings 52A, 52B and 52C of the reactors RE1, RE2 and RE3 are each provided with a plurality of tap connections R1 through R4 which are disposed either at the ends of the respective windings or intermediate the ends of the respective windings.

The transformer tap-changer position selector switch 60A is connected to the primary winding sections 24A and 26A to select the number of turns of the winding section 24A that will be connected in series circuit relationship with the turns of the winding section 26A. In like manner, the transformer tap-changer position selector switches 60B and 60C are connected to the primary winding sections 24B and 26B and 24C and 26C, respectively. In particular, the transformer tap-changer position selector switch 60A comprises a common terminal 62A, a movable selector arm 64A, and a plurality of tap positions T1 to T8. Similarly, the selector switches 60B and 60C comprise the common terminals indicated at 62B and 62C, respetcively, the movable selector arms 64B and 64C, respectively, and a plurality of tap connections T1 to T8. The plurality of tap connections 33 of the primary winding section 24A is connected to the tap positions T1 to T8 of the selector switch 60A. The common terminal 62A of the selector switch 60A is connected to the left end of the primary winding section 26A. In like manner, the plurality of tap connections 35 of the primary winding section 24B is connected to the tap positions T1 to T8 of the selector switch 20B and the left end of the primary winding section 26B is connected to the common terminal 62B of the selector switch 60B, while the plurality of tap connections 37 of the primary winding section 24C is connected to the tap positions T1 to T8 of the selector switch 60C and the left end of the primary winding section 26C is connected to the common terminal 62C of the selector switch 60C. In general, the transformer tap-changer position selector switches 60A, 60B and 60C are connected so that as the selector arms 64A, 64B and 64C, respectively, rotate, a tap connection will be selected which will determine what portions of the primary winding sections 24A, 24B and 24C, respectively, are connected in series circuit relationship with the associated primary winding sections 26A, 26B and 26C, respectively. It is to be noted that the tap positions T1 through T8 of the selector switches 60A, 60B and 60C are preferably disposed radially in a substantially circular arrangement with the adjacent tap positions displaced from one another by substantially equal angles as shown in FIG. 1B.

The reactor tap-changer position selector switches 70A, 70B and 70C are connected to the windings 52A, 52B and 52C, respectively, of the reactors RE1, RE2 and RE3, respectively to select the portion of the reactor windings 52A, 52B and 52C, respectively, that will be connected in series circuit relationship with the associated primary winding sections 24A and 26A, 24B and 26B and 24C and 26C, respectively, of the transformer 20, and also to control or determine whether the primary windings of the transformer 20 and the associated windings of the reactors RE1, RE2 and RE3 are to be connected either in a delta or in a Y arrangement with respect to the line conductors L1, L2 and L3. In particular, the selector switch 70A comprises a movable contact member or arm 72A, a plurality of tap positions YR1 to YR4 and DR1 to DR4, and the conducting segments Y1, which are disposed adjacent to the tap positions YR1 to YR4, and D1, which is disposed adjacent to the tap positions DR1 to DR4. Similarly, the selector switches 70B and 70C comprise the movable contact members 72B and 72C, respectively, a plurality of tap positions YR1 to YR4 and DR1 to DR4 and the conducting segments Y1 and D1. The tap positions YR1 to YR4 and DR1 to DR4 of each of the selector switches 70A, 70B and 70C are preferably disposed radially in a substantially circular arrangement with the adjacent tap positions displaced from one another by substantially equal angles. In this instance, the conducting segments D1 and Y1 are preferably substantially semi-circular in configuration. The plurality of tap connections R1 through R4 of the reactor RE1 is connected to the tap positions YR1 through YR4, respectively, and also to the tap positions DR1 through DR4, respectively, of the selector switch 70A. Similarly, the plurality of tap connections R1 through R4 of the reactors RE2 and RE3 are connected to the tap positions YR1 through YR4 of the selector switches 70B and 70C, respectively, and also to the tap positions DR1 through DR4, respectively, of the selector switches 70B and 70C, respectively. The conducting segments D1 of the selector switches 70A, 70B and 70C are electrically connected to the line conductors L2, L3 and L1, respectively, while the conducting segments Y1 of said selector switches are each connected to a common neutral terminal, as indicated at N1. In general, the selector switches 70A, 70B and 70C are connected so that as the movable contact arms 72A, 72B and 72C, respectively, rotate about the central axes 76A, 76B and 76C, respectively, a tap position will be selected by the respective selector switches which will determine what portion of the reactor windings 52A, 52B and 52C, respectively, of the reactors RE1, RE2 and RE3 respectively is connected in series circuit relationship with the associated primary winding sections 24A and 26A, 24B and 26B and 24C and 26C, respectively, and also whether said windings are to be connected in a delta or Y arrangement with respect to the line conductors L1, L2 and L3. When the movable contact arms 72A, 72B and 72C of the selector switches 70A, 70B and 70C respectively are engaging one of the tap positions YR1 through YR4 of said selector switches, the movable contact arms 72A, 72B and 72C are also engaging the conducting segments Y1 of the respective selector switches to thereby connect the reactor windings 52A, 52B and 52C of the respective reactors, as well as the associated primary windings of the transformer 20, in a Y arrangement with respect to the line conductors L1, L2 and L3, since the conducting segments Y1 of the selector switches 70A, 70B and 70C are all connected to the neutral terminal N1. On the other hand, when the movable contact arms 72A, 72B and 72C of the selector switches 70A, 70B and 70C, respectively, are engaging one of the tap positions DR1 through DR4 of the respective selector switches, the movable contact arms 72A and 72B and 72C of the respective selective switches are also engaging the conducting segments D1 of the respective selector switches, which are connected to the line conductors L2, L3 and L1, respectively to thereby connect the windings of the reactors RE1, RE2 and RE3 and the associated primary windings of the transformer 20 in a delta arrangement with respect to said line conductors.

Referring to FIG. 1B, the selector arms 64A, 64B and 64C of the transformer tap-changer position selector switches 60A, 60B and 60C are mechanically linked through a suitable operating shaft as indicated at 56 to a reversible, direct-current drive motor 250 whose operation is controlled by the control circuit 30. Similarly, the movable contact arms 72A, 72B and 72C of the reactor tap-changer position selector switches 70A, 70B and 70C, respectively are mechanically linked through a suitable operating shaft as indicated at 68 to a reversible direct-current drive motor 250' whose operation is controlled by the control circuit 40. In general, the tap-changing equipment and its associated control apparatus which determine the position of the selector switches 60A, 60B and 60C includes the control circuit 30, the controller means 110, the rotary switches RS1 through RS4 and the master control switch 270 while the tap-changing equipment and its associated control apparatus which determine the position of the selector switches 70A, 70B and 70C includes the control circuit 40, the controller means 120, the rotary switches RS11 through RS14 and also the master control switch 270, as will be explained in detail hereinafter.

In particular, the control circuit 30 comprises a clockwise relay 220 having associated therewith an auxiliary or motor control relay 240, a counterclockwise relay 210 having associated therewith an auxiliary or motor control relay 230, a main contactor or interposing relay MC1 and a time delay relay TD1 which are connected in circuit relation for energizing the motor 250 from a direct-current source at the conductors PC1 and NC1 through the conductors TL1 and NL1, respectively, to turn in one direction or the other whenever the clockwise relay 220 or the counterclockwise relay 210 is energized by the master control switch 270 through the rotary switches RS1 through RS4 and the controller 110.

The reversible motor 250 comprises an armature 227, a shunt field 226 and a series field 228. In order to energize the motor 250 for rotation in one direction or the other, a direct-current voltage of one polarity or the other must be applied to the armature 227 of the motor 250 from the source conductors PC1 and NC1 by the control circuit 30. The clockwise relay 220 comprises an operating coil 222, two normally closed contacts 224A and 224D and two normally open contacts 224B and 224C while its associated auxiliary or motor control relay 240 similarly comprises an operating coil 242, two normally open contacts 244A and 244D and two normally closed contacts 244B and 244C. Similarly, the counterclockwise relay 210 comprises an operating coil 212, two normally closed contacts 214A and 214C and two normally open contacts 214B and 214D, while its auxiliary or motor control relay 230 similarly comprises an operating coil 232, two normally closed contacts 234A and 234D and two normally open contacts 234B and 234C. One end of the operating coil 222 of the clockwise relay 220 is connected to the positive source conductor PC1 through the normally closed contact 214A of the counterclockwise relay 210 and the conductor PL1, while one end of the operating coil 212 of the counterclockwise relay 210 is directly connected to the positive source conductor PC1 by the conductor PL1. The other end of the operating coil 222 of the clockwise relay 220 is connected to the controller 110 by the conductor 281, while the other end of the operating coil 212 of the counterclockwise relay 210 is connected to the controller 110 through the normally closed contact 224A of the clockwise relay 220 and the conductor 282.

In order to initially energize the motor 250 for rotation in a clockwise direction and to move the selector arms of the selector switches 60A, 60B and 60C in a clockwise direction, the upper end of the operating coil 222 of the clockwise relay 220 at the conductor 281 must be connected to the negative source conductor NC1 by the master control switch 270, one of the rotary switches RS1 through RS4 and the controller 110, as will be described in greater detail hereinafter. Assuming that the negative source conductor NC1 as connected to the conductor 281, a closed circuit is then formed through the operating coil 222 of the clockwise relay 220 which extends from the conductor 281 through said operating coil, the normally closed contact 214A of the counterclockwise relay 210, and the conductor PL1 to the positive source conductor PC1. By energizing the clockwise relay 220 in the manner just indicated, the normally closed contacts 224A and 224D of the clockwise relay 220 are actuated to circuit interrupting positions while the normally open contacts 224B and 224C of said relay are actuated to circuit closing positions. The opening of the contact 224A prevents the energization of the counterclockwise relay 210 whenever the clockwise relay 220 is energized. The closing of the contact 224B of the clockwise relay 220 energizes the time delay relay TD1 since a closed circuit is formed which extends from the positive source conductor PC1 through the conductor PL1, the contact 224B of the clockwise relay 220, the operating coil 252 of the time delay relay TD1 and back to the negative source conductor NC1 through the conductor NL1. Energizing the time delay relay TD1, which is of the general type whose contacts remain in the energized position for a short time after the relay is deenergized, actuates the two normally open contacts 254A and 254B of the time delay relay TD1 to circuit closing positions. The closing of the contact 254A of the time delay relay TD1 energizes the contactor MC1 since a closed circuit is then formed which extends from the conductor PL1 through the contact 254A and the operating coil 262 of the contactor MC1 to the conductor NL1. Energizing the contactor MC1 actuates the three normally open contacts 264A, 264B and 264C of the contactor MC1 to circuit closing positions.

The closing of the contacts 264B and 264C of the contactor MC1 applies a direct-current voltage across the shunt field 226 of the motor 250 from the source conductors PC1 and NC1 since the closing of the contact 264B connects one side of the shunt field 226 to the positive source conductor PC1 through the conductor PL1, while the other side of the shunt field 226 is connected to the source conductor NC1 through the contact 264C and the conductor NL1. The closing of the contact 264C of the contactor NC1 also connects one end of the series field winding 228 of the motor 250 to the negative source conductor NC1 through the conductor NL1. It is to be noted that the field discharge resistor 229 is connected in parallel circuit relationship with the shunt field winding 226 of the motor 250. The closing of the contact 264A of the contactor MC1 energizes the motor control relay 240, which is associated with the clockwise relay 220, by forming a closed circuit which extends from the positive source conductor PC1 through the conductor PL1, the operating coil 242 of the motor control relay 240, the closed contact 224C of the clockwise relay 220, the closed contact 264A of the contactor MC1, and back to the negative source conductor NC1 through the conductor NL1. The open contact 224D of the clockwise relay 220 prevents the energization of the motor control relay 230, which is associated with the counterclockwise relay 210, as long as the clockwise relay 220 is energized. Energizing the motor control relay 240 applies a direct-current voltage of a first predetermined polarity to the series circuit which includes the armature 227 of the motor 250 and the series field winding 228 of the motor 250 by forming a closed circuit which extends from the positive source conductor PC1 through the conductor PL1, the contact 264B of the contactor MC1 to the terminal 225, through the normally closed contact 234A of the relay 230, the closed contact 244A of the motor control relay 240, the armature 227 of the motor 250, the closed contact 244D of the motor control relay 240, the normally closed contact 234D of the relay 230, the series field winding 228 of the motor 250, the contact 264C of the contactor MC1, and back to the negative source conductor NC1 through the conductor NL1. When the motor 250 is energized in the manner just described to rotate in a clockwise direction, the selector arms 64A, 64B and 64C of the selector switches 60A, 60B and 60C, respectively, are also actuated by the motor 250 to rotate in a clockwise direction through the mechanical linkage or operating shaft 56, as previously mentioned.

The motor 250 may be energized for counterclockwise rotation by energizing the counterclockwise relay 210 similarly to the manner in which the clockwise relay 220 is energized, as just described. Briefly, the counterclockwise relay 210 is energized by connecting the upper end of the operating coil 212 of the counterclockwise relay 210 to the negative source conductor NC1 through the normally closed contact 224A of the clockwise relay 220 and the conductor 282 by means of the master control switch 270, one of the rotary switches RS1 through RS4 and the controller 110. Energizing the counterclockwise relay 210 next energizes the time delay relay TD1, similarly to the manner in which said time delay relay was energized by the operation of the clockwise relay 220. Energizing the time delay relay TD1 next energizes the contactor MC1 which applies a direct-current voltage to the shunt field winding 226 of the motor 250 from the source conductors PC1 and NC1, as previously described in connection with the clockwise relay 220. The motor control relay 230 is next energized by the operation of the counterclockwise relay 210 and the contactor MC1 to apply a direct-current voltage to the series circuit, which includes the armature 227 of the motor 250 and the series field winding 228, of a predetermined polarity which is opposite to the polarity of the direct-current voltage applied to the armature 227 of the motor 250 by the operation of the clockwise relay 220 to thereby energize the motor 250 to rotate in a counterclockwise direction. Energization of the motor 250 to rotate in a counterclockwise direction by the energizing of the counterclockwise relay 210 also actuates the selector arms 64A, 64B and 64C of the selector switches 60A, 60B and 60C, respectively, to rotate also in a counterclockwise direction through the mechanical linkage or operating shaft 56.

In order to apply dynamic braking to the motor 250, after said motor has once been energized for rotation in one direction or the other by the energization of the clockwise relay 220 or the counterclockwise relay 210, the braking resistors 256 and 258 are provided. One end of the braking resistor 256 is connected to the common terminal between the normally closed contact 244B of the motor control relay 240 and the normally open contact 234D of the motor control relay 230, while the other end of said braking resistor is connected to the common terminal between the normally open contact 244D of the motor control relay 240 and the normally closed contact 234D of the motor control relay 230. Similarly, one end of the braking resistor 258 is connected to the common terminal between the normally open contact 244A of the motor control relay 240 and the normally closed contact 234A of the motor control relay 240, while the other end of said braking resistor is connected to the common terminal between the normally closed contact 244C of the motor control relay 240 and the normally open contact 234C of the motor control relay 230.

The operation of the dynamic braking circuit may be illustrated by assuming that the motor 250 has been energized for clockwise rotation by the energization of the clockwise relay 220, as previously described, and then that the clockwise relay 220 is deenergized to thereby deenergize the motor 250 and stop the rotation of the motor 250. As long as the clockwise relay 220 remains energized, the time delay relay TD1, the contact MC1 and the motor control relay 240 will also remain energized, as previously described. If the operating coil 222 of the clockwise relay 220 is then deenergized, the normally closed contacts 224A and 224D of the clockwise relay 220 will then be restored to their normally closed positions and the normally open contacts 224B and 224C of the clockwise relay 220 will also be restored to their normal positions in substantially instantaneous fashion. The opening of the contact 224B of the clockwise relay 220 will deenergize the operating coil of the time delay relay TD1, but the contacts 254A and 254B of the contact relay TD1 will remain in circuit closing positions because of the time delay characteristics of the time delay relay TD1 previously mentioned, thus maintaining the contactor MC1 in an energized condition and the motor control relay 240 also in energized condition because of the closed circuit which extends from the conductor PL1 through the operating coil 242 of the motor control relay 240, the normally closed contact 214C of the counterclockwise relay 210, the contact 254A of the time delay relay TD1 which remains closed for a short time after the time delay relay TD1 is deenergized, and the closed contact 264A of the contactor MC1 which also remains energized for a short time to the conductor NL1. The closing of the contact 224D of the clockwise relay 220 serves to energize the motor control relay 230 while the motor control relay 240 remains energized for a short time through the closed circuit which extends from the conductor PL1 through the operating coil 232 of the motor control relay 230, the contact 224D of the clockwise relay 220, the contact 254B of the time delay relay TD1 and the contact 264A of the contactor MC1 to the conductor NL1. The energizing of the motor control relay 230 actuates the two normally closed contacts 234A and 234D of the motor control relay 230 to circuit interrupting positions and to actuate the two normally open contacts 234B and 234C of the motor control relay 230 to circuit closing positions. The opening of the contacts 234A and 234D of the motor control relay 230 first removes any power or voltage from the armature 227 of the motor 250. The immediate closing thereafter of the contacts 234B and 234C of the motor control relay 230, while the motor control relay 240 still remains energized for a short time with its contacts 244A and 244D still closed, connects the braking resistors 256 and 258 both directly across the armature 227 of the motor 250 and in parallel circuit relationship with one another to thereby brake the motor 250 to a complete stop. The braking resistors 256 and 258 provide similar braking action whenever the counterclockwise relay 210 has been energized to thereby energize the motor for counterclockwise rotation and then the counterclockwise relay 210 is subsequently deenergized.

In order to insure a complete step operation of the selector switches 60A, 60B and 60C, when said selector switches are actuated from one of the tap positions T1 through T8 to another of said tap positions by the operation of the drive motor 250, the cam switch means 110A is provided as part of the controller means 110 which is actuated by the operation of the drive motor 250 through the mechanical linkage or coupling indicated at 54, whenever the selector switches 60A, 60B and 60C are moved or actuated by said drive motor. It is to be understood that the cam switch means 110A need not be provided as an integral part of the controller means 110, but that the cam switch means 110A may be disposed as a separate cam switch means or rotary switch device which is actuated by the operation of the drive motor 250. The cam switch means 110A comprises the stationary contact members HC1, HC2 and HC3 and a plurality of movable contact members CM1 through CM8 which are associated with the tap positions T1 through T8 respectively of the selector switches 60A, 60B and 60C. The cam switch means 110A holds one of the movable contact members CM1 through CM8 in the closed position with respect to the associated stationary contacts HC1, HC2 and HC3 when the selector switches 60A, 60B and 60C are moving from one of the tap positions T1 through T8 to the next tap position. On the completion, however, of each step operation of the selector switches 60A, 60B and 60C, the cam switch means 110A permits whichever of the movable contact members CM1 through CM8 which has been in a closed position with respect to the associated stationary contact members HC1, HC2 and HC3 during a particular step operation of the selector switches 60A, 60B and 60C to become disengaged from the stationary contacts HC1, HC2 and HC3. It is to be noted that the stationary contact member HC1 of the cam switch means 110A is electrically connected to the terminal 296 which is electrically connected in turn to the negative source conductor NC1 through the conductor NL3. The stationary contact member HC2 of the cam switch means 110A is electrically connected to the upper end of the operating coil 222 of the clockwise relay 220 of the control circuit 30 by the conductor 281, while the stationary contact member HC3 is similarly connected to the upper end of the operating coil 212 of the counterclockwise relay 210 through the conductor 282 and the normally closed contact 224A of the clockwise relay 220 in the control circuit 30.

In the operation of the cam switch means 110A, whenever the selector switches 60A, 60B and 60C are actuated from one of the tap positions T1 through T8 to another of said tap positions by the drive motor 250, when it is energized initially by the master control switch 270 through one of the rotary switches RS1 through RS4, and the controller means 110, or when said motor is energized by the operation of the controller means 110 alone during certain operating conditions, one of the movable cam members CM1 through CM8 is actuated to a closed position with respect to the associated stationary contact members HC1, HC2 and HC3 as soon as the selector switches 60A, 60B and 60C rotate off out of the tap positions T1 through T8 to insure that the motor 250 will remain energized until the next tap position of the respective selector switches is reached. When the selector switches 60A, 60B and 60C reach the next position of the respective selector switches, whichever of the movable contact members CM1 through CM8 has been actuated to a closed position with respect to the associated stationary contact members, will then be actuated to an open position with respect to said stationary contact members to thereby deenergize the drive motor 250 unless said drive motor is otherwise energized by the operation of the master control switch 270 through one of the rotary switches RS1 through RS4, and the controller means 110, or by the controller means 110 alone during certain operating conditions.

For example, assuming that the clockwise relay 220 of the control circuit 30 is initially actuated by the master control switch 270 through one of the rotary switches RS1 through RS4 and the controller 110 to thereby energize the drive motor 250 and actuate the selector switches 60A, 60B and 60C off one of the tap positions T1 through T8, then one of the movable contact members CM1 through CM8 of the cam switch means 110A will be actuated to a closed position with respect to the stationary contact members HC1, HC2 and HC3. A holding or sealing circuit will then be formed for maintaining the energization of the clockwise relay 220 and the drive motor 250 which extends from the negative source conductor NC1 through the conductor NL3 to the terminal 296, the stationary contact member HC1 of the cam switch means 110A, one of the movable contact members CM1 through CM8 of said cam switch means, the stationary contact member HC2 of said cam switch means and the conductor 281 to the upper end of the operating coil 222 of the counterclockwise relay 220 and through the normally closed contact 214A of the counterclockwise relay 210 and the conductor PL1 to the positive source conductor PC1. On the other hand, assuming that the counterclockwise relay 210 has been initially energized to thereby energize the drive motor 250 and actuate the selector switches 60A, 60B and 60C off position, then one of the movable contact members CM8 of the cam switch means 110A will be actuated to a closed position with respect to the associated stationary contact members HC1, HC2 and HC3 to form a holding circuit which will maintain the energization of the counterclockwise relay 210 and the drive motor 250 until the next position of the respective selector switches is reached. The latter holding circuit extends from the negative source conductor NC1 through conductor NL3 to the terminal 296, through the stationary contact member HC1 of the cam switch means 110A, one of the movable contact members CM1 through CM8 of said cam switch means, the stationary contact member HC3 of said cam switch means, the conductor 282, and the normally closed contact 224A of the clockwise relay 220 to the upper end of the operating coil 212 of the counterclockwise relay 210, through the operating coil 212 and the conductor PL1 to the positive source conductor PC1. The holding circuits thus formed by the cam switch means 110A whenever one of the clockwise or counterclockwise relays 220 and 210, respectively, is energized to thereby energize the drive motor 250 and actuate the selector switches 60A, 60B and 60C from one of the tap positions T1 through T8 to the next of said tap positions will maintain the energization of the drive motor 250 until the next tap position of the respective selector switches is reached and then open to deenergize the drive motor 250 unless said drive motor is otherwise energized by the master control switch 270 through one of the rotary switches RS1 through RS4 and the controller 110, or by the controller 110 alone during certain operating conditions.

In general, the control circuit 40 is identical to the control circuit 30 previously described and is provided to control the operation of the drive motor 250' when the control circuit 40 is actuated by the master control switch 270 through one of the rotary switches RS11 through RS14 and the controller means 120. The control circuit 40 is connected in circuit relation with the source conductors PC1 and NC1 by the conductors PL2 and NL2 respectively, similarly to the control circuit 30, and in circuit relation with the controller means 120 by the conductors 205 and 206, similarly to the control circuit 30. When energized by the control circuit 40, the drive motor 250' actuates the operation of the selector switches 70A, 70B and 70C which are associated with the reactors RE1, RE2 and RE3 respectively, through the mechanical linkage or operating shaft indicated at 68. The operation of the drive motor 250' also actuates the operation of the controller means 120 which includes a cam switch means 120A similarly to the controller 110 through the mechanical linkage or coupling indicated at 66. Similarly to the cam switch means 110A, the cam switch means 120A includes the stationary contact members HC11, HC12, HC13 and a plurality of movable contact members CM11 through CM18. The stationary contact member HC11 of the cam switch means 120A is connected to the negative source conductor NC1 through the terminal 296 and the conductor NL3 while the stationary contact members HC12 and HC13 are connected to the control circuit 40 through the conductors 205 and 206, respectively.

The operation of the control circuit 40 is the same as the operation of the control circuit 30 previously described. Briefly, whenever the control circuit 40 is actuated by the master control switch 270 through one of the rotary switches RS11 through RS14 and the controller 120 to energize the drive motor 250', the drive motor 250' then actuates the selector switches 70A, 70B, 70C to select one of the tap positions YR1 through YR4 and DR1 through DR4 to thereby select one of the tap connections R1 through R4 of the reactors RE1, RE2 and RE3 and also to determine whether said reactors and the associated primary windings of the transformer 20 are connected either in a delta or Y arrangement with respect to the line conductors L1, L2 and L3. The cam switch means 120A operates similarly to the cam switch means 110A to insure that the drive motor 250' remains energized whenever the selector switches 70A, 70B and 70C move off position until said selector switches reach the next tap position of said selector switches.

In general, the master control switch 270 includes a first switch section 270A which cooperates with the rotary switches RS1 through RS4 and the controller 110 to actuate the control circuit 30 to energize the drive motor 250 which then actuates the selector switches 60A, 60B and 60C to select one of a limited number of tap positions selected from among the tap positions T1 through T8 of said selector switches and to eliminate undesired tap positions from among the tap positions T1 through T8 in the operation of the control circuit 30. Similarly, the master control switch 270 includes a second switch section 270B which cooperates with one of the rotary switches RS11 through RS12 and the controller 120 to actuate the control circuit 40 to energize the drive motor 250' which then actuates the selector switches 70A, 70B and 70C to select one of a limited plurality of tap positions selected from the tap positions YR1 through YR4 and DR1 through DR4 of said selector switches and to eliminate undesired tap positions selected from the tap positions YR1 through YR4 and DR1 through DR4 in the operation of the control circuit 40. It is to be noted that the first and second switch sections 270A and 270B of the master control switch 270 are mechanically ganged or coupled together by the mechanical linkage or interlock 292 to be actuated simultaneously and to thereby simultaneously actuate the associated control circuits 30 and 40, respectively, which then independently actuate the associated selector switches 60A, 60B and 60C and 70A, 70B and 70C, respectively, to the desired tap positions of the different switches.

In particular, the first switch section 270A of the master control switch 270 includes a common terminal 205, a movable selector arm 284 and four stationary contact positions 201 through 204. The selector arm 284 is disposed to engage one of the latter contact positions and connect the common terminal 205 thereto. Similarly, the second switch second 270B of the master control switch 270 includes a common terminal 215, a movable selector arm 294 and four stationary contact positions 211 through 214. The selector arm 294 is disposed to engage one of the latter contact positions and connect the common terminal 215 thereto. The common terminals 205 and 215 of the first and second switch seconds 270A and 270B respectively and the master control switch 270 are both connected to the terminal 286 and to the negative source conductor NC1 through the switch or interlock 298, which is normally closed, the terminal 296 and the conductor NL3. The master control switch 270 is preferably of the general type in which the selector arms 284 and 294 of the first and second switch seconds 270A and 270B respectively may be actuated from one of the associated contact positions to another of said contact positions without engaging the intermediate contact positions. The switch or interlock 298 is provided to prevent the master control switch 270 from actuating the operation of the selector switches 60A, 60B and 60C and the selector switches 70A, 70B and 70C unless certain associated protective equipment, such as circuit breakers, provided with the transformer 20 or the reactors RE1, RE2 and RE3 are in the open circuit positions.

The rotary switches RS1 through RS4 are connected in circuit relation with the first switch section 270A of the master control switch 270 to select which of the tap positions T1 through T8 of the selector switches 60A, 60B and 60C will be associated with each of the four contact positions 201 through 204 of the first switch section 270A. The rotary switches RS1 through RS4 are identical and each includes a common terminal indicated as CT1 through CT4, respectively, a selector switch arm SA1 and a plurality of stationary contact positions C1 through C8. The selector switch arms SA1 of the rotary switches RS1 through RS4 are disposed to engage one of the associated stationary contact positions C1 through C8 and connect the asociated common terminal thereto. The common terminals CT1 through CT4 of the rotary switches RS1 through RS4 respectively are connected to the stationary contact positions 201 through 204, respectively, of the first switch section 270A of the master control switch 270. The stationary contact positions C1 through C8 of each of the rotary switches RS1 through RS4 are associated with the tap positions T1 through T8, respectively, of each of the selector switches 60A, 60B and 60C. To select the tap position of the selector switches 60A, 60B and 60C which will be associated with each of the stationary contact positions 201 through 204 of the first switch section 270A, the selector arms SA1 of the associated rotary switches RS1 through RS4 respectively are actuated manually or otherwise to one of the corresponding stationary contact positions C1 through C8.

The controller 110 is connected in circuit relation between the rotary switches RS1 through RS4 and the control circuit 30 to eliminate undesired tap positions of the selector switches 60A, 60B and 60C in the operation of the control circuit 30 and also to determine the initial direction of rotation of the drive motor 250 when the control circuit 30 is initially actuated by the master control switch 270, more specifically the first switch selection 270A, through one of the rotary switches RS1 through RS4 and the controller 110.

In particular, the controller 110 comprises the first and second controller or drum switch sections 110B and 110C, respectively, and the cam switch means 110A which was previously described. The first controller section 110B includes a plurality of stationary or fixed contacts SC1 through SC8 which are associated with the tap positions T1 through T8, respectively, of the selector switches 60A, 60B and 60C, a common stationary or fixed terminal CC1 and the first and second conducting segments CS1 and CS2, respectively, which are electrically connected by the flexible lead or conductor FL1 and which are disposed on a drum which is actuated by the drive motor 250 through the mechanical linkage 54, as previously mentioned. Similarly, the second controller section 110C includes a plurality of stationary or fixed contacts SC11 through SC18 which are associated with the tap position T1 through T8, respectively, of each of the selector switches 60A, 60B and 60C, the common stationary terminal CC2 and the first and second conducting segments CS3 and CS4, respectively, which are electrically connected by the flexible lead or conductor FL2 and which are disposed on a drum which is actuated by the drive motor 250 through the mechanical linkage 54, as previously mentioned. The stationary contacts SC1 through SC8 of the first controller section 110B and the stationary contacts SC11 through SC18 of the second controller section 110C are each connected to the conductor leads CL1 through CL8, respectively, which are connected in turn to the stationary contact positions C1 through C8, respectively, of each of the rotary switches RS1 through RS4. The common terminal CC1 of the first controller section 110B is connected to the clockwise relay 220 in the control circuit 30 by the conductor 281 while the common terminal CC2 of the second controller section 110C is connected to the counterclockwise relay 210 of the control circuit 30 through the conductor 282 and the normally closed contact 224A of the clockwise relay 220. The first and second conducting segments CS1 and CS2, respectively, of the first controller section 110B and the first and second conducting segments CS3 and CS4, respectively, of the second controller section 110C are disposed to selectively and sequentially engage the associated fixed contacts SC1 through SC8 and SC11 through SC18, respectively, to provide eight switching positions identified as 1 through 8, depending on which of the positions the controller 110 is actuated to by the drive motor 250. It is to be noted that the common stationary terminal CC1 of the first controller section 110B is engaged in all positions of the controller 110 by the first conducting segment CS1 while the common stationary terminal CC2 of the second controller section 110C is engaged in all positions of the controller 110 by the first conducting segment CS3 of the second controller section 110C.

Each of the positions 1 through 8 of the controller 110 is associated with one of the tap positions T1 through T8, respectively, of each of the selector switches 60A, 60B and 60C. The conducting segments CS1 and CS2 of the first controller section 110B and the conducting segments CS3 and CS4 of the second controller section 110C are arranged so that when the controller 110 is in a particular operating position, the conducting segments CS1 and CS2 will be in an open circuit position with respect to the stationary contact of the first controller section 110B which is associated with the tap position of the selector switches 60A, 60B and 60C which corresponds to the latter operating position of the controller 110 while the conducting segments CS3 and CS4 will also be in open circuit position with respect to the associated stationary contact that is associated with the same tap position of the selector switches 60A, 60B and 60C, that corresponds to the latter operating condition of the controller 110. For example, when the controller 110 is in position 1 as shown in FIG. 1A, the conducting segments CS1 and CS2 of the first controller section 110B will both be in an open circuit position with respect to the stationary contact SC1 which is associated with the tap position T1 of the selector switches 60A, 60B and 60C which corresponds to the operating position 1 of the controller 110, while the conducting segments CS3 and CS4 of the second controller section 110C will also both be in an open circuit position with respect to the stationary contact SC11 which is associated also with the tap position T1 of the selector switches 60A, 60B and 60C which corresponds to the operating position 1 of the controller 110.

In general, the controller 110 is connected in circuit relation between the rotary switches RS1 through RS4 and the control circuit 30 to permit the master control switch 270 to energize the clockwise relay 220 or the counterclockwise relay 210 of the control circuit 30 initially, and to maintain energization of the drive motor 250 through the undesired tap positions of the selector switches 60A, 60B and 60C when the tap position of the selector switches 60A, 60B and 60C selected by the master control switch 270 is changed from one of the tap positions T1 through T8 to another of said tap positions. In particular, the first controller section 110B of the controller 110 permits the master control switch 270 to initially energize the clockwise relay 220 during certain operating conditions, while the second controller section 110C permits the master control switch 270 to energize the counterclockwise relay 210 during other operating conditions. It is to be noted that when the tap position selected by the selector switches 60A, 60B and 60C corresponds to the tap position selected by the master control switch 270 and one of its associated rotary switches RS1 through RS4 and when the operating position of the controller 110 also corresponds to the tap position selected by the master control switch 270, then the clockwise relay 220 and the counterclockwise relay 210 of the control circuit 30 will both be deenergized since the circuits which extend from the common terminal 205 of the first switch section 270A of the master control switch 270 through one of the rotary switches RS1 through RS4 and the first and second controller sections 110B and 110C of the controller 110 will both be open and the movable contact members CM1 through CM8 of the cam switch means 110A will also be in an open circuit position with respect to the stationary contacts HC1, HC2 and HC3 of the cam switch means 110A. The motor 250 will therefore be deenergized and the selector switches 60A, 60B and 60C will be at rest.

On the other hand, if the first switch section 270A of the master control switch 270 is actuated to select a new tap position of the selector switches 60A, 60B and 60C such a the tap position which corresponds to the contact position 202 of the first switch section 270A, then the control circuit 30 will be actuated to energize the motor 250 which, in turn, will actuate the selector switches 60A, 60B and 60C to the new desired tap position. Assuming that the selector arm 284 of the first switch selector 270A is actuated from the position 201 as shown in FIG. 1A to the position 202, then a closed circuit will be formed which extends from the negative source conductor NC1 through the conductor NL3, the terminal 296, the switch 298, the terminal 286, the common terminal 205 of the first switch section 270A, the contact position 202 of the first switch section 270A, the common terminal CT2 of the rotary switch RS2, the contact position C3 of the rotary switch RS2, the conductor lead CL3, the stationary contact SC3 of the first controller section 110B, the conducting segment CS2 of the first controller section 110B, the flexible lead FL1, the conducting segment CS1 of the first controller section 110B, the common terminal CC1 of said first controller section, the conductor 281, the counterclockwise relay 220 of the control circuit 30, the normally closed contact 214A of the counterclockwise relay 210 and to the positive source conductor PC1 through the conductor PL1. The clockwise relay 220 will thus be energized to energize the drive motor in the manner previously described which will then actuate the selector arms 64A, 64B and 64C of the selector switches 60A, 60B and 60C, respectively, in a clockwise direction until the tap position T3 is reached and until the first and second controller sections 110B and 110C, respectively, of the controller 110 are actuated to position 3 which will then open the circuit just described and deenergize the clockwise relay 220. It is to be noted that the first controller section 110B of the controller 110 effectively shunts the contacts of the cam switch means 110A during the latter operation to thereby maintain the energization of the motor 250 while the selector switches 60A, 60B and 60C pass through the undesired tap position T2. The operation of the cam switch means 110A as previously described would be to maintain the energization of the motor 250 between the successive tap positions of the selector switches 60A, 60B and 60C and then to deenergize the motor 250 to provide step by step operation for the selector switches 60A, 60B and 60C in the absence of the operative effect of the first controller section 110B.

The controller 110, more specifically the first and second controller sections 110B and 110C, respectively, also operates to effectively minimize the travel and operating time of the selector switches 60A, 60B and 60C when the first switch section 270A of the master control switch 270 is actuated from one of the contact positions 201 to 204 to another of said contact positions. The conducting segments CS1 and CS2 of the first controller section 110B and the conducting segments CS3 and CS4 of the second controller section 110C of the controller 110 are arranged so that when a new tap position selected by the first switch section 270A of the master control switch 270 of the selector switches 60A, 60B and 60C is four positions or less in a clockwise direction, then the drive motor 250 will be energized by the control circuit 30 in a clockwise direction while if the new tap position selected by the first switch section 270A of the master control switch 270 is three positions or less in a counterclockwise direction, then the drive motor 250 will be energized by the control circuit 30 to rotate in a counterclockwise direction. In other words, if the new tap position selected by the first switch section 270A of the master control switch 270 is four positions or less in a clockwise direction, then the clockwise relay 220 of the control circuit 30 will be energized to thereby energize the motor 250 for rotation in a clockwise direction. The latter operating condition was previously described by assuming that the selector arm 284 of the first switch section 270A was actuated from the position 201 as shown in FIG. 1A to the contact position 202 in which the tap position T3 of the selector switches 60A, 60B and 60C is selected.

On the other hand, if the new position selected by the first switch section 270A of the master control switch 270 is actuated to select a new tap position which is three tap positions or less in the counterclockwise direction, then the counterclockwise relay 210 of the control circuit 30 will be energized to thereby energize the drive motor 250 and actuate the selector switches 60A, 60B and 60C in a counterclockwise direction to the new selected tap position. For example, assume that the selector arm 284 of the first switch section 270A of the master control switch 270 is actuated from the contact position 201 as shown in FIG. 1A to the contact position 204 which corresponds to the tap position T7 of the selector switches 60A, 60B and 60C as selected by the rotary switch RS4. Since the new tap position selected is three positions or less in a counterclockwise direction from the tap position T1 which was previously selected by the first switch section 270A, then the counterclockwise relay 210 of the control circuit 30 will be energized by the closed circuit which extends from the negative source conductor NC1 through the conductor NL3, the terminal 296, the switch 298, the terminal 286, the common terminal 205 of the first switch section 270A, the selector arm 284 and the contact position 204 of said first switch section, the common terminal CT4 of the rotary switch RS4, the selector arm SA1 of said rotary switch, the stationary contact position C7 of said rotary switch, the conductor lead CL7, the stationary contact SC17 of the second controller section 110C, the conducting segment CS4, the flexible lead FL2, the conducting segment CS3, the common terminal CC2 of said second controller section, the conductor 232, the normally closed contact 224A of the clockwise relay 220, the operating coil 212 of the counterclockwise relay 210 and back to the positive source conductor PC1 through the conductor PL1.

The second switch section 270B of the master control switch 270 controls the operation of the selector switches 70A, 70B and 70C through the rotary switches RS11 through RS14 and the controller 120 similarly to the first switch section 270A and its associated rotary switches RS1 through RS4 in a controller 110. Briefly, the second switch section 270B comprises a common terminal 215, a selector arm 294 and four stationary contact positions 211, through 214 which are selectively engaged by said selector arm to electrically connect one of said contact positions to the common terminal 215. The rotary switches RS11 through RS14 each comprises a common terminal, indicated at CT11 through CT14 respectively, the selector switch arms SA11 and a plurality of stationary contact positions C11 through C13. The common terminals CT11 through CT14 of the rotary switches RS11 through RS14 are connected to the stationary contact positions 211 through 214, respectively, of the second switch section 270B, similarly to the rotary switches RS1 through RS4 previously described. The controller 120 includes the cam switch means 120A, which was previously described, and the first and second controller sections 120B and 120C respectively, similarly to the controller 110. The first controller section 120D includes a plurality of stationary contacts SC21 through SC28 which are associated with the tap positions YR1 through YR4 and DR1 through DR4, respectively, of the selector switches 70A, 70B and 70C, first and second conducting segments CS11 and CS12, respectively, which are electrically connected by the flexible lead FL11 and mounted on a drum which is actuated by the drive motor 250' through the mechanical linkage 66 previously mentioned. The second controller section 120C also comprises a plurality of stationary contacts SC31 through SC38 which are associated with the tap positions YR1 through YR4 and DR1 through DR4, respectively, of the selector switches 70A, 70B and 70C, a common terminal CC12, and the first and second conducting segments CS13 and CS14, respectively, which are electrically connected by the flexible lead FL12 and which are mounted on a drum which is actuated also by the drive motor 250' through the mechanical linkage 66. The conducting segments CS11 and CS12 of the first controller section 120D and the conducting segments CS13 and CS14 of the second controller section 120C selectively and sequentially engage the associated stationary contacts of said controller sections to provide eight operating positions identified as 1 through 8 which correspond to the tap positions YR1 through YR4 and DR1 and DR4, respectively, of the selector switches 70A, 70B and 70C. The common terminal CC11 of the first controller section 120B is connected to the conductor 205 to the control circuit 40 while the common terminal CC12 of the second controller section 120C is also connected to the control circuit 40 through the conductor 206.

The operation of the second switch section 270B in cooperation with the rotary switches RS11 through RS14 and the controller 120 is exactly the same as the first switch section 270A and its associated rotary switches RS1 through RS4 and the controller 110 previously described to actuate the selector switches 70A, 70B and 70C to one of four desired tap positions. The controller 120 similarly operates to eliminate the undesired tap positions in the operation of the control circuit 40 and also minimizes the travel and operating time of the selector switches 70A, 70B, 70C in similar fashion to the controller 110 as previously described.

It is to be understood that in certain applications that individual stationary switches or means for changing conductor connections, such as conductor links or terminal boards, may be substituted for the rotary switches RS1 through RS4 and the rotary switches RRS11 through RS14. In addition, it is to be understod that additional controller means, similar to the controllers 110 and 120, may be provided and actuated by the drive motors 250 and 250' in certain applications for energizing indicating lights to indicate the positions of the respective selector switches. It is also to be understood that in certain applications that cam switches or rotary switches which are actuated by the associated drive motor may be substituted for the first and second controller sections of each of the controllers 110 and 120 except that the travel and operating time of the associated selector switches when actuated by the operation by a means, such as the master control switch 270, may not be minimized or reduced in the manner provided by the controllers 110 and 120.

The apparatus embodying the teachings of this invention has several advantages. For example, a transformer and its associated reactor each having associated therewith tap-changing equipment, may be controlled with a minimum of operating time and travel of said tap-changing equipment. In addition, all the tap connections provided on both the transformer and the reactor can be made available to the associated tap-changing equipment without entering the tanks of either the transformer or the reactor and undesired tap positions may be readily eliminated in the operation of the tap-changing equipment. It is to be noted that in the apparatus disclosed, that the rotary switches RS1 through RRS4 and RS11 through RS14 may be conveniently actuated to select new desired positions of the associated selector switches. Finally, in the control apparatus as disclosed, the tap-changing equipments which are separately provided with a transformer and its associated reactor are simultaneously actuated to change the positions of each tap-changing equipment, with each tap-changing equipment being actuated independently to a new operating position. It is to be noted that in a control apparatus as disclosed, that each tap position selected by the first switch section of the master control switch 270A is simultaneously coordinated with a tap position selected by the second switch section 270B on the reactors RE1, RE2 and RE3, as well as with either a delta or Y arrangement of the transformer 20 and the associated reactors RE1, RE2 and RE3.

Since numerous changes may be made in the above described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A tap-changer system for a transformer having a plurality of phase windings each provided with a plurality of tap connections, each of said phase windings having connected in series therewith a reactor phase winding provided with a plurality of tap connections, a first multiple position switch for selecting one of the tap connections in each of said transformer phase windings, a second multiple position switch for selecting one of the tap connections of each reactor phase winding and either a delta or Y connection of said phase windings, first and second operating shafts for changing positions of said first and second switches, respectively, first and second drive motors for driving said first and second shafts, respectively, first and second control circuits for energizing the respective motors, first means actuated by each of said shafts and connected to each of said control circuits for maintaining the energization of each motor after it is energized until the next position of the respective switch is reached and then for deenergizing the respective motors, and second means actuated by each of said shafts having contacts associated with each position of the respective switches, said contacts of said second means being connected to the respective control circuits for preventing said first means from deenergizing the respective motors when undesired positions of the respective switches are reached after the respective motors are energized.

2. A tap-changer system for a transformer having a plurality of phase windings each provided with a plurality of tap connections, each of said phase windings having connected in series therewith a reactor phase winding provided with a plurality of tap connections, a first multiple position switch for selecting one of the connections in each of said transformer phase windings, a second multiple position switch for selecting one of the tap connections of each reactor phase winding and either a delta or Y connection of said phase windings, first and second operating shafts for changing positions of said first and second switches, respectively, first and second drive motors for driving said first and second shafts, respectively, first and second control circuits for independently energizing the respective motors, first means actuated by each of said shafts and connected to each of said control circuits for maintaining the energization of each motor after it is energized until the next position of the respective switch is reached and then for deenergizing the respective motors, and second means actuated by each of said shafts having contacts associated with each position of the respective switches, said contacts of said second means being connected to the respective control circuits for preventing said first means for deenergizing the respective motors when undesired positions of the respective switches are reached after the respective motors are energized, said second means each including a plurality of conductors connected in circuit relation between said second means and said control circuit to select the undesired positions of the respective multiple position switches.

3. A tap-changer system for a transformer having a plurality of phase windings each provided with a plurality of tap connections, each of said phase windings having connected in series therewith a reactor phase winding provided with a plurality of tap connections, a first multiple position switch having a plurality of positions disposed substantially radially about a common axis in a circular arrangement and displaced from one another by substantially equal angles for selecting one of the tap connections in each of said transformer phase windings, a second multiple position switch having a plurality of positions disposed substantially radially about a common axis in a circular arrangement and displaced from one another by substantially equal angles for selecting one of the tap connections of each reactor phase winding, first and second operating shafts for changing positions of said first and second switches, respectively, first and second drive motors for driving said first and second shafts to change the positions of the respective switches, respectively, first and second control circuits for energizing the respective motors, first means actuated by each of said shafts and connected to each of said control circuits for maintaining the energization of each motor after it is energized until the next position of the respective switch is reached and then for deenergizing the respective motors, and second means actuated by each of said shafts having contacts associated with each position of the respective switches, said contacts of said second means being connected to the respective control circuits for preventing said first means from deenergizing the respective motors when undesired positions of the respective switches are reached after the respective motors are energized, said second means each including a drum controller and stationary switch means connected in circuit relation between said first means and said control circuit.

4. A tap-changer system for a transformer having a plurality of phase windings each provided with a plurality of tap connections, each of said phase windings having connected in series therewith a reactor phase winding provided with a plurality of tap connections, a first multiple position switch for selecting one of the tap connections in each of said transformer phase windings, a second multiple position switch for selecting one of the tap connections of each reactor phase winding and either a delta or Y connection of said phase windings, first and second operating shafts for changing positions of said first and second switches, respectively, first and second drive motors for driving said first and second shafts, respectively, first and second control circuits for energizing the respective motors, first means actuated by each of said shafts and connected to each of said control circuits for maintaining the energization of each motor after it is energized until the next position of the respective switch is reached and then for deenergizing the respective motors, and second means actuated by each of said shafts having contacts associated with each position of the respective switches, said contacts of said second means being connected to the respective control circuits for preventing said first means from deenergizing the respective motors when undesired positions of the respective switches are reached after the respective motors are energized, said second means including cam switch means.

5. A tap-changer system for a transformer having a plurality of phase windings each provided with a plurality of tap connections, each of said phase windings having connected in series therewith a reactor phase winding provided with a plurality of tap connections, a first multiple position switch for selecting one of the tap connections in each of said transformer phase windings, a second multiple position switch for selecting one of the tap connections of each reactor phase winding and either a delta or Y connection of said phase windings, first and second operating shafts for changing positions of said first and second switches, respectively, first and second drive motors for driving said first and second shafts, respectively, first and second control circuits for energizing the respective motors, cam switch means actuated by each of said shafts and connected to each of said control circuits for maintaining the energization of each motor after it is energized until the next position of the respective switch is reached and then for deenergizing the respective motors, and means actuated by each of said shafts having contacts associated with each position of the respective switches, said contacts of said last-mentioned means being connected to the respective control circuits for preventing said cam switch means from deenergizing the respective motors when undesired positions of the respective switches are reached after the respective motors are energized, said last-mentioned means each including rotary switch means actuated by the respective shafts.

6. A tap-changer system for a transformer having a plurality of phase windings each provided with a plurality of tap connections, each of said phase windings having connected in series therewith a reactor phase winding provided with a plurality of tap connections, a first multiple position switch for selecting one of the tap connections in each of said transformer phase windings, a second multiple position switch for selecting one of the tap connections of each reactor phase winding and either a delta or Y connection of said phase windings, first and second operating shafts for changing positions of said first and second switches, respectively, first and second drive motors for driving said first and second shafts, respectively, first and second control circuits for energizing the respective motors, first means actuated by each of said shafts and connected to each of said control circuits for maintaining the energization of each motor after it is energized until the next position of the respective switch is reached and then for deenergizing the respective motors, second means actuated by each of said shafts having contacts associated with each position of the respective switches, said contacts of said second means being connected to the respective control circuits for preventing said first means from deenergizing the respective motors when undesired positions of the respective switches are reached after the respective motors are energized, said second means including cam switch means, and selector switch means connected in circuit relation with each of said second means for actuating said control circuit to energize said motor and select one of the positions of the respective multiple position switches.

7. In combination, a multiple position switch having a plurality of positions disposed substantially radially in a circular arrangement, an operating shaft for causing movement of said switch, a drive motor for rotating said shaft, a control circuit for energizing said motor to change positions of said switch, first means connected in circuit relation with said control circuit for actuating said control circuit to energize said motor to rotate in either direction and select one of a predetermined plurality of positions of said switch, and second means connected in circuit relation with said first means and said control circuit for controlling the direction of rotation of said motor when energized by said control circuit in response to said first means to minimize the number of positions through which said switch passes between first and second predetermined positions of said switch, said second means including a pair of contact means associated with each position of said switch and arranged to be actuated in a sequential manner by the movement of said shaft.

8. In combination, a multiple position switch having a plurality of positions disposed substantially radially in a circular arrangement, an operating shaft for causing rotational movement of said switch, a drive motor for rotating said shaft, a control circuit for energizing said motor to change positions of said switch, cam switch means actuated by said shaft and having contacts associated with each position of said switch connected to said control circuit for maintaining the energization of said motor after it is energized by said control circuit until the next position of said switch is reached and then for deenergizing said motor, a controller-means actuated by the movement of said shaft and having first and second contacts associated with each position of said multiple position switch and connected in circuit relation with said control circuit for preventing said cam switch means from deenergizing said motor when undesired positions of said switch are reached after said motor is energized, and selector switch means connected in circuit relation with said controller-means for actuating said control circuit to energize said motor and select one of a predetermined plurality of desired positions of said multiple position switch, the contacts of said controller-means being arranged to control the initial direction of rotation of said motor when energized and then to open and close in a sequential manner with the movement of said shaft and minimize the travel of said switch when said selector switch means causes movement of said switch from one selected position to another selected position.

9. In combination, a multiple position switch having a plurality of positions disposed substantially radially in a circular arrangement, an operating shaft for causing rotational movement of said switch, a drive motor for rotating said shaft, a control circuit for energizing said motor to change positions of said switch, cam switch means actuated by said shaft and having contacts associated with each position of said switch connected to said control circuit for maintaining the energization of said motor after it is energized by said control circuit until the next position of said switch is reached and then for deenergizing said motor, a controller-means actuated by the movement of said shaft and having first and second contacts associated with each position of said multiple position switch and connected in circuit relation with said control circuit for preventing said cam switch means from deenergizing said motor when undesired positions of said switch are reached after said motor is energized, and selector switch means connected in circuit relation with said controller means for actuating said control circuit to energize said motor and select one of a predetermined plurality of desired positions of said multiple position switch, the contacts of said controller-means being arranged to control the initial direction of rotation of said motor when energized and then to open and close in a sequential manner with the movement of said shaft and minimize the travel of said switch when said selector switch means causes movement of said switch from one selected position to another selected position, said selector switch means including a master selector switch and a plurality of rotary switches connected in circuit relation with said controller-means to select the undesired positions of said multiple position switch.

10. In combination, a multiple position switch having a plurality of positions disposed substantially radially in a circular arrangement, an operating shaft for causing rotational movement of said switch, a drive motor for rotating said shaft, a control circuit for energizing said motor to change positions of said switch, cam switch means actuated by said shaft and having contacts associated with each position of said switch connected to said control circuit for maintaining the energization of said motor after it is energized by said control circuit until the next position of said switch is reached and then for deenergizing said motor, a controller-means actuated by the movement of said shaft and having first and second contacts associated with each position of said multiple position switch and connected in circuit relation with said control circuit for preventing said cam switch means from deenergizing said motor when undesired positions of said switch are reached after said motor is energized, and selector switch means connected in circuit relation with said controller-means for actuating said control circuit to energize said motor and select one of a predetermined plurality of desired positions of said multiple position switch, the contacts of said controller-means being arranged to control the initial direction of rotation of said motor when energized and then to open and close in a sequential manner with the movement of said shaft and minimize the travel of said switch when said selector switch means causes movement of said switch from one selected position to another selected position, said selector switch means including a master selector switch and a plurality of conductors connected in circuit relation with said controller-means to select the undesired positions of said multiple position switch.

11. In combination, a multiple position switch having a plurality of positions disposed substantially radially about a common axis in a circular arrangement and displaced from one another by substantially equal angles, an operating shaft for causing rotational movement of said switch, a drive motor for rotating said shaft, a control circuit for energizing said motor to change positions of said switch, cam switch means actuated by said shaft and having contacts associated with each position of said switch connected to said control circuit for maintaining the energization of said motor after it is energized by said control circuit until the next position of said switch is reached and then for deenergizing said motor, a controller-means actuated by the movement of said shaft and having first and second contacts associated with each position of said multiple position switch and connected in circuit relation with said control circuit for preventing said cam switch means from deenergizing said motor when undesired positions of said switch are reached after said motor is energized, and selector switch means connected in circuit relation with said controller-means for actuating said control circuit to energize said motor and select one of a predetermined plurality of desired positions of said multiple position switch, the contacts of said controller-means being arranged to control the initial direction of rotation of said motor when energized and then to open and close in a sequential manner with the movement of said shaft and minimize the travel of said switch when said selector switch means causes movement of said switch from one selected position to another selected position, said selector switch means including a master selector switch and a plurality of stationary switches connected in circuit relation with said controller-means to selected the undesired positions of said multiple position switch.

12. A tap-changer system for a transformer having a plurality of phase windings each provided with a plurality of tap connections, each of said phase windings having connected in series therewith a reactor phase winding provided with a plurality of tap connections, a first multiple position switch having a plurality of positions disposed substantially radially about a common axis in a circular arrangement and displaced from one another by substantially equal angles for selecting one of the tap connections in each of said transformer phase windings, a second multiple position switch having a plurality of positions disposed substantially radially about a common axis in a circular arrangement and displaced from one another by substantially equal angles for selecting one of the tap connections of each reactor phase winding, first and second operating shafts for changing positions of said first and second switches, respectively, first and second drive motors for driving said first and second shafts to change the positions of the respective switches, respectively, first and second control circuits for energizing the respective motors, to change positions of the associated switches, first means connected in circuit relation with each of said control circuits for actuating the associated control circuit to energize the associated motor to rotate in either direction and select one of the positions of the associated switch, and second means connected in circuit relation with each of said first means and the associated control circuit for controlling the direction of rotation of the associated motor when energized by the respective control circuit in response to the associated first means to minimize the number of positions through which each switch passes between first and second predetermined positions of each switch, said second means including a pair of contact means associated with each position of each switch and arranged to be actuated in a sequential manner by the movement of the associated shaft.

13. A tap-changer system for a transformer having a plurality of phase windings each provided with a plurality of tap connections, each of said phase windings having connected in series therewith a reactor phase winding provided with a plurality of tap connections, a first multiple position switch having a plurality of positions disposed substantially radially about a common axis in a circular arrangement and displaced from one another by substantially equal angles for selecting one of the tap connections in each of said transformer phase windings, a second multiple position switch having a plurality of positions disposed substantially radially about a common axis in a circular arrangement and displaced from one another by substantially equal angles for selecting one of the tap connections of each reactor phase winding, first and second operating shafts for changing positions of said first and second switches, respectively, first and second drive motors for driving said first and second shafts to change the positions of the respective switches, respectively, first and second control circuits for energizing the respective motors, to change positions of the associated switches, first means connected in circuit relation with each of said control circuits for actuating the associated control circuit to energize the associated motor to rotate in either direction and select one of the positions of the associated switch, and second means connected in circuit relation with each of said first means and the associated control circuit for controlling the direction of rotation of the associated motor when energized by the respective control circuit in response to the associated first means to minimize the number of positions through which each switch passes between first and second predetermined positions of each switch, said first means comprising a master selector switch and a plurality of rotary switches connected in circuit relation with said second means, said second means including a pair of contact means associated with each position of each switch and arranged to be actuated in a sequential manner by the movement of the associated shaft.

14. A tap-changer system for a transformer having a plurality of phase windings each provided with a plurality of tap connections, each of said phase windings having connected in series therewith a reactor phase winding provided with a plurality of tap connections, a first multiple position switch having a plurality of positions disposed substantially radially about a common axis in a circular arrangement and displaced from one another by substantially equal angles for selecting one of the tap connections in each of said transformer phase windings, a second multiple position switch having a plurality of positions disposed substantially radially about a common axis in a circular arrangement and displaced from one another by substantially equal angles for selecting one of the tap connections of each reactor phase winding, first and second operating shafts for changing positions of said first and second switches, respectively, first and second drive motors for driving said first and second shafts to change the positions of the respective switches, respectively, first and second control circuits for energizing the respective motors, first means actuated by each of said shafts and connected to each of said control circuits for maintaining the energization of each motor after it is energized until the next position of the respective switch is reached and then for deenergizing the respective motors, a controller means associated with each of said multiple position switches and actuated by the movement of the associated shaft, each of said controller means having first and second contacts associated with each position of the associated multiple position switch and connected in circuit relation with the associated control circuit for preventing the associated first means from deenergizing the associated motor when undesired positions of the associated multiple position switch are reached after the associated motor is energized, and selector switch means connected in circuit relation with each of said controller means for actuating the associated control circuit to energize the associated motor and select one of a predetermined plurality of desired positions of the associated multiple position switch, the contacts of each controller means being arranged to control the initial direction of rotation of the associated motor when energized and then to open and close in a sequential manner with the movement of the associated shaft and to minimize the travel of the associated switch when the associated selector switch means causes movement of the associated multiple position switch from one selected position to another selected position.

References Cited in the file of this patent
UNITED STATES PATENTS

| | | |
|---|---|---|
| 2,114,143 | Hunter | Apr. 12, 1938 |
| 2,915,694 | Bogert | Dec. 1, 1959 |